United States Patent [19]
Hufford

[11] 3,851,771
[45] Dec. 3, 1974

[54] MATERIAL HANDLING DEVICE

[75] Inventor: Donald L. Hufford, Charlevoix, Mich.

[73] Assignee: Hufford Industries, Inc., Charlevoix, Mich.

[22] Filed: Dec. 11, 1972

[21] Appl. No.: 314,125

[52] U.S. Cl............ 214/1 BB, 214/1 BD, 214/147 T
[51] Int. Cl. ................................................ B66c 1/42
[58] Field of Search .. 214/1 BB, 1 BD, 1 BT, 147 T

[56] References Cited
UNITED STATES PATENTS

| | | | |
|---|---|---|---|
| 1,930,608 | 10/1933 | Manken | 214/1 BB |
| 2,677,471 | 5/1954 | Skinner | 214/1 BT UX |
| 2,833,426 | 5/1958 | Bosken | 214/1 BT X |
| 3,349,927 | 10/1967 | Blatt | 214/1 BT |
| 3,718,216 | 2/1973 | Wilson | 214/1 BC |

*Primary Examiner*—Robert G. Sheridan
*Assistant Examiner*—George F. Abraham
*Attorney, Agent, or Firm*—Price, Heneveld, Huizenga & Cooper

[57] ABSTRACT

A pair of piston-actuated work handling jaws are suspended from a carriage movable reciprocally along a pair of stationary guide rails supported adjacent a press or the like. The rails extend toward the press and have their outer ends deflected so that as the carriage reaches the outer end of the rails it is deflected both inwardly and downwardly to permit the jaws to engage the work piece. Rearward movement of the carriage after jaw actuation lifts the work piece from the press for subsequent deposit when the carriage is moved away from the press.

11 Claims, 3 Drawing Figures

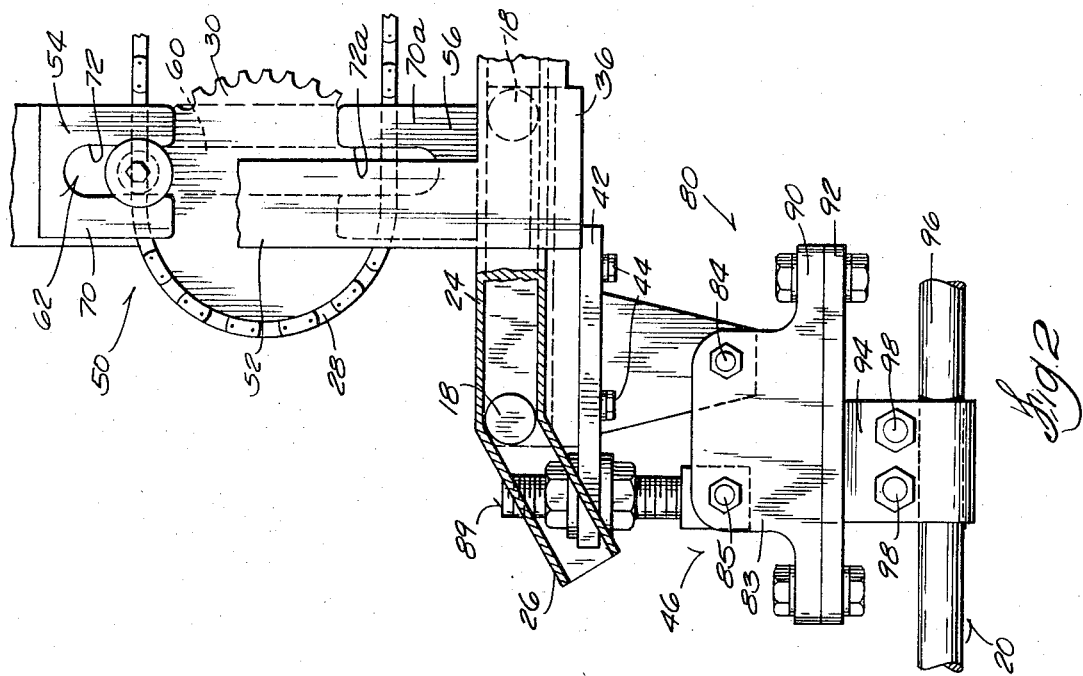
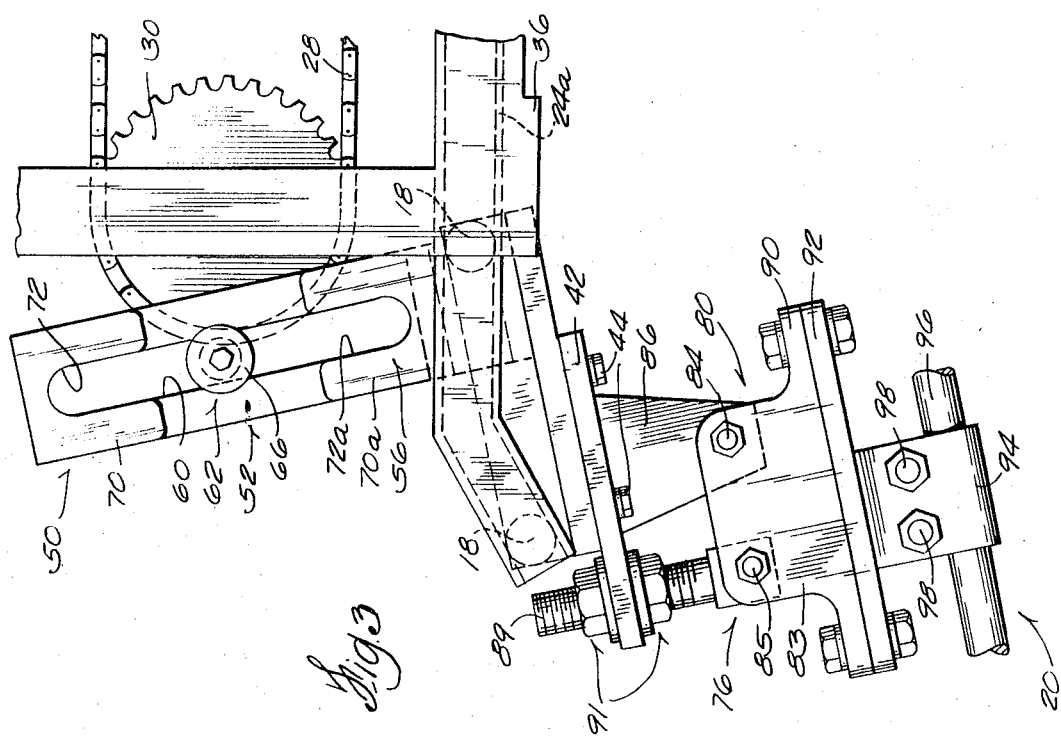

MATERIAL HANDLING DEVICE

BACKGROUND OF THE INVENTION

This invention relates to a material handling device particularly adapted to automatically load or unload metal stampings or the like from a press or machine.

The prior art includes various work handling devices adapted to be positioned alongside a press for inserting or removing parts therefrom. These prior art devices include a work gripping or handling means extending toward the press and slidably mounted to move independently of the latter toward and away from the press, the work handling means being provided with means for gripping or otherwise handling a work piece. The particular work piece varies, of course, in size and shape depending on the end result of the stamping. Due to the shape of most stamped work pieces, it is necessary for the proper insertion or removal of the work piece that the work handling means be movable vertically as it is shifted into position to grip the work piece. likewise, as the work piece is extracted from the press, there must also be imparted a vertical movement to lift the work piece from the lower die or platen of the press as the work handling means is removed from the press. While there are devices in the prior art that provide such a movement, they are inadequate in that the movement of the work handling means into and away from the press is not necessarily under a positive control as regards the vertical movement of the work handling means. Of equal importance, the prior known devices are complex in their operation and therefore expensive. In a shop, regardless of its size, the utilization of a material handling device definitely increases the overall efficiency and output of the shop. However, the cost of such devices is definitely a consideration in most installations. Thus, there is a need for a device which operates effectively under positive automatic control and is both simple and economically reasonable. The simplicity of the device is also important in terms of repairs and costly down time.

SUMMARY OF THE INVENTION

In accordance with the invention, the material handling device is comprised of a stationary guide means mounted on a support frame with the guide means having first and second portions angularly related to each other. A carriage is movable reciprocally along the guide means toward and away from the press during movement along the first guide portion and movable simultaneously toward or away and up or down relative the press during movement along the second guide portion. A material handling means is operable when the device is utilized as an unloader to be inserted forwardly and downwardly to grip the work piece during carriage movement along the second guide portion. Rearward movement of the carriage then lifts the work piece up out of the press while at the same time retracting the work piece.

In narrower aspects of the invention, the operation of the material handling means is automatically actuated in accordance with the position of the carriage along the guide means and an extremely simplified positive drive means is provided for reciprocally moving the carriage in such a way as to greatly simplify the overall configuration of the device.

The guide means of the present invention provides a positive control over the operation of the device at all positions therealong. The deflected portion of the guide means provides a simplified and yet positive deflection of the material handling means for insertion into and withdrawal from the associated press. The combination of the carriage and material handling means with the preferred reciprocal drive provides an overall simplified and economically attractive package.

DESCRIPTION OF THE DRAWINGS

FIG. 2 is a fragmentary side elevation view of the carriage and drive means of the invention prior to deflection; and FIG. 3 is similar to FIG. 2 with the carriage shown in the deflected portion of the guide means.

DESCRIPTION OF THE PREFERRED EMBODIMENT

Figure 1:
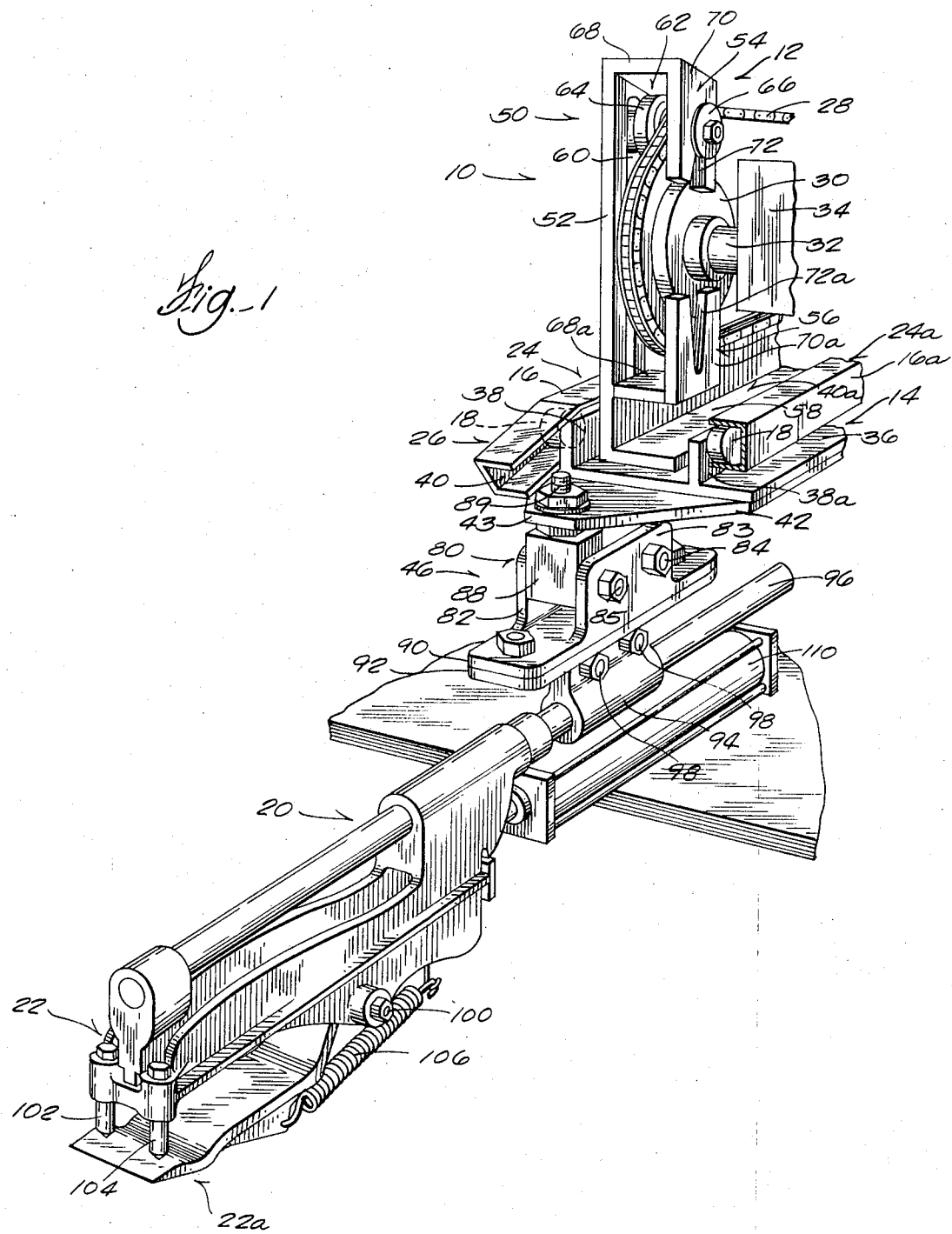
FIG. 1 is a fragmentary perspective view of the reciprocating material handling device of the invention.

Referring now to the drawings in detail, FIG. 1 illustrates the material handling device 10 of my invention comprising a reciprocating drive mechanism 12 which drives a carriage 14 confined for movement along a pair of guide rails 16, 16a. The device is supported by a frame, the details of which are not shown. The carriage is mounted on rollers 18 fore and aft confined within the guide rails. A material gripping mechanism 20 is suspended from the carriage and includes a pair of jaws 22, 22a which are piston-actuated to grip and release the related work piece, the latter not being shown.

The guide rails 16, 16a have a horizontal section 24, 24a and inclined sections 26, 26a at the outer end of the track so that as the carriage moves along the horizontal section (FIG. 2) the carriage and related gripping mechanism 20 moves along a horizontal path. However, when the carriage enters the outer inclined sections 26, 26a (FIG. 3), the carriage is deflected both horizontally and vertically since the carriage is in effect cammed by the inclined sections of the guide rails. This camming action provides the requisite vertical motion for the jaws 22, 22a to be inserted down into the lower die or platen portion of a press (not shown) and pick the work piece up and out upon rearward reciprocal movement.

Referring now in greater detail to the drawings, FIG. 1 illustrates the drive mechanism 12 utilized to drive carriage 14. The drive mechanism 12 is comprised of a continuous chain 28 driven by a drive sprocket (not shown) and a take-up sprocket 30. Sprocket 30 is mounted on an axle 32 which projects from a mounting 34. The details of the gear train and its mounting to a frame as well as the take-up sprocket motor and drive chain are not shown since they are mechanically expedient in the art.

Carriage 14 is comprised of a flat bed 36 having a pair of upturned flanges 38, 38a to which are mounted rollers 18. Thus, the carriage bed in essence is suspended by the rollers, the latter being confined within guide rails 16 and 16a. The guide rails are preferably comprised of channel elements in a general C shape, the open portions 40, 40a facing each other inwardly. The gripping mechanism 20 is suspended from carriage 14 by a subplate 42 secured to the bottom surface of bed 36 by appropriate fasteners 44 (FIGS. 2 and 3). Subplate 42 has a nose portion 43 which extends outwardly beyond bed 36 for receipt of an adjustable adapter mechanism 46 which will be described in more detail hereinafter.

Carriage 36 is connected with drive mechanism 12 by a yoke assembly 50 comprising a yoke member 52 and a pair of subyoke members 54 and 56. Yoke member 52 is an elongated plate member with a projecting flange portion 58 at its lower end giving the yoke member an overall L-shape configuration. Flange portion 58 is anchored to carriage bed 36 by appropriate fasteners so that the yoke member is rigid with the carriage. An elongated closed slot 60 extends vertically in yoke member 52 for cooperative engagement with a pusher dog roller assembly 62. Roller assembly 62 is anchored to one of the links of chain 28 by a plate mechanism (not shown), the latter including two laterally extending roller dogs 64 and 66 extending on opposite sides of the plate assembly. Roller dog 64 is captured within elongated slot 60 so that as the chain is driven around the drive and take-up sprockets, roller dog 64 imparts reciprocal horizontal movement of carriage 16, the direction of which depends upon whether the pusher dog roller assembly 62 is being moved forwardly on the upper portion of the closed track of the chain or rearwardly on the lower portion of the closed track of the chain. As the pusher dog roller assembly 62 is moved vertically about the ends of the drive and take-up sprocket, the direction of movement of carriage 16 is reversed as well as its velocity since pusher dog 64 is moving primarily vertically within slot 60. The specific details of drive mechanism 12 are more clearly disclosed in my copending application entitled LOADING DEVICE FOR PRESSES filed Oct. 30, 1971, Ser. No. 185,052, now U.S. Pat. No. 3,741,374, which application is incorporated herein by reference.

Subyokes 54 and 56 are anchored to yoke member 52 and include a horizontal portion 68, 68a and vertical yoke portion 70, 70a. The horizontal portions 68, 68a space the vertical portions laterally from yoke member 52 so that the vertical portions 70, 70a are positioned on the opposite side of drive chain 28 and the take-up and drive sprockets. Portions 70, 70a extend inwardly toward each other and are spaced a distance to permit clearance above and below axle 32 as the carriage and yoke assembly reciprocates forwardly and rearwardly.

Each of the vertical portions 70, 70a include a wedge-shaped slot 72, 72a open at the inner end, the slot having its maximum cross section at the inner open ends. Slots 72, 72a, receive the second roller dog 66 of pusher dog roller assembly 62 alternatively as the pusher dog roller assembly is moved along the upper portion or lower portion respectively of the closed track of chain 28. The pusher dog roller assembly 62 including roller dog 66 is disengaged from the subyoke assemblies at each end of its closed path. Reference is made to the above-identified copending application for more specific details of drive mechanism 12. The drive mechanism, however, provides a smooth positive center line thrust on the yoke assembly since the utilization of a pair of roller dogs engaged on each side of a single chain drive neutralizes the moment created by the mounting assembly of the pusher dog roller assembly 62.

Referring now to FIGS. 2 and 3, the gripping mechanism 20 illustrated in FIG. 1 is suspended from carriage 16 by an adapter bracket 80. Adapter bracket 80 is a U-shaped yoke which includes a pair of spaced upstanding flange portions 82, 83 pivotally connected by a fastener 84 to a mounting 86 which depends from subplate 42. Adapter bracket 80 is free to pivot about fastener 84 if unrestrained. However, the adapter bracket is secured to subplate 42 at two positions to prevent pivotal movement during use. The forward portion of upstanding flanges 82 and 83 is secured to the nose portion 43 of subplate 42 by a vertically adjustable block member 88 secured by a fastener 85 at one end to adapter bracket 80. A threaded shaft 89 is anchored in the upper side of block 88 and secured to plate 42 by a pair of nuts and washers 91 to permit vertical adjustment relative to carriage subplate 42 so that the orientation of adapter bracket 80 relative to carriage 16 can be selected angularly depending on the length of shaft 89. Once this angular configuration is selected, it is generally maintained for the particular use intended. It will be appreciated that the angular selection of adapter bracket 80 will orientate the gripping mechanism 20 at the same angle relative to carriage 16. Generally, for most purposes, adapter bracket 80 is mounted in a horizontal orientation so that the gripping mechanism which includes jaws 22 and 22a extend generally parallel with carriage 14. The adjustable adapter mechanism 46, however, permits a certain amount of leeway depending on the particular configuration of the lower die or platen from which the gripping mechanism is intended to grip and retract the particular work piece.

Adapter bracket 80 includes a lower horizontal web portion 90 extending laterally to each side of cupping portion 82 for receipt of a mounting plate 92.

Adapter bracket 80 includes a lower horizontal web portion 90 from which gripping mechanism 20 (FIG. 1) is suspended by a mounting plate 92 which includes a depending sleeve 94, which clamps about a mounting bar 96 which forms the primary extending portion of gripping mechanism 20. A pair of fasteners 90a clamp sleeve 94 about rod 96 and can be loosened to permit longitudinal adjustment of the rod relative the sleeve.

Referring now to FIG. 1, the material gripping mechanism 20 is comprised of a primary support rod 96 from which a pair of jaws 22 and 22a are suspended by a housing 98. The upper jaw 22 is stationary with respect to the rod 96 while the lower jaw 22a pivots about a shaft 100 relative to housing 98. In the embodiment illustrated, upper jaw 22 includes a pair of teeth 102 and 104 which are threaded through a portion of housing 98 to permit adjustment of their vertical adjustment. The lower jaw 22a comprises a tongue which is pivoted up into clamping engagement with the ends of teeth 102 and 104. Jaw 22a is spring biased opened by a spring 106 and actuated into clamping engagement by a piston-cylinder 110. The operation of gripping mechanism 20 is conventional and well known in the art and it will be appreciated that a number of different types of gripping mechanism could be utilized depending upon the intended use.

OPERATION

Having described the apparatus in detail, its operation should be readily understood. With the apparatus positioned adjacent a press or the like, the drive chain 28 is operated on a continuous basis for removing carriage 14 reciprocally back and forth within the confines of guide rails 16, 16a. As the carriage approaches its outermost position as illustrated in FIG. 2, the front set of wheels 18 enter the deflected track portion 26 and are deflected downwardly and inwardly toward the press as illustrated in FIG. 3 with the front set of wheels reaching the outer end of guide rails 16, 16a as the pusher roller assembly 62 reaches the outermost position with respect to sprocket 30. At this moment, the carriage is not moving since it has become decelerated in a direction from right to left in FIG. 3 and further downward movement of the pusher roller assembly will begin its retractionary movement away from the press. At the position illustrated in FIG. 3, the gripping jaws 22 and 22a are actuated into clamping engagement with the work piece in the press and as the chain continues its rotational path, the work piece is lifted up and away from the press as carriage 14 returns to its normal horizontal position illustrated in FIG. 2. As carriage 14 is retracted from left to right in FIGS. 2 and 3, the work piece can be deposited in an appropriate receptacle (not shown). The resultant operation of the apparatus of my invention provides a smooth continuous automatic removal of parts from the press with the carriage at all times being under positive confined control in that it is continuously indexed within guide tracks 16 and 16a. It will be appreciated that the apparatus can also be utilized for inserting work pieces into the press.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows.

1. Apparatus for inserting or removing a work piece from a press comprising, in combination: a support; stationary guide means extending from said support toward the press, said guide means being channel shaped and having a horizontal portion and a terminal portion extending downwardly from the outer end of the horizontal portion at an incline thereto; carriage means having first and second longitudinally spaced rollers confined within said channel shaped guide means at all positions and movable along said guide means toward and away from the press; reciprocating drive means for continuously and reciprocally moving said carriage means back and forth along said guide means; and work handling means carried by said carriage means and having means for automatically gripping and releasing the work piece, said means for gripping and releasing the work piece being cooperatively associated with the position of said carriage means whereby as said carriage means is moved toward said press along said terminal guide portion, said means for gripping and releasing the work piece moves both vertically and horizontally on an incline into gripping engagement with the work piece, and as said carriage means is moved away from the press, said means for gripping and releasing the work piece grips the work piece to move it up and out of the press for travel along said horizontal portion.

2. The apparatus according to claim 1 wherein said work handling means includes a pair of jaws extending generally horizontally toward the press, at least one of said jaws being pivotal toward and away from the other to grip or release the work piece therebetween, said work handling means being suspended from said carriage means by an adapter bracket pivotally adjustable relative said guide means and carriage to permit pivotal adjustment of said work handling means relative said carriage means.

3. The apparatus according to claim 2 wherein said adapter bracket is anchored to said carriage means by a first means permitting pivotal movement of said adapter bracket relative said carriage means and a second means permitting vertical movement of said adapter bracket relative said carriage means whereby adjustment of said second means causes pivotal movement of said adapter bracket about said first means to permit arbitrary selection of the angle of incidence of said jaws relative said carriage means.

4. The apparatus according to claim 2 wherein said jaws are actuated in timed sequence with the position of said carriage means along said guide means so that said jaws are actuated into or out of gripping engagement with the work piece as said carriage means reaches its outermost position along said terminal guide portions, and is conversely actuated out of or into gripping engagement with the work piece as said carriage means reaches a second position along said horizontal portion of said guide means.

5. Apparatus for inserting or removing a work piece from a press comprising, in combination: a support; stationary guide means extending from said support toward the press, said guide means having a first guide portion and a second guide portion, said second guide portion being inclined relative to said first guide portion; carriage means confined by and movable along said guide means toward and away from the press; drive means for reciprocally moving said carriage means back and forth along said guide means, said drive means is comprised of a single endless chain mounted above said guide means for movement about a drive and idler sprocket in a generally vertical plane, said drive means including a pusher means secured to said chain for continuous reciprocal movement therewith along an upper and lower path, said pusher means being cooperably associated with said carriage means to move said carriage means back and forth along said guide means, said pusher means including first and second pusher dogs extending from each side of said chain; a yoke connected to said carriage means and having a vertically oriented elongated slot receiving said first pusher dog, said slot extending at least above and below said sprocket so that said first pusher dog is movably confined within said slot to drive said yoke and carriage back and forth along said guide means as said pusher dog moves with said chain along said upper and lower paths; and a half yoke connected to said carriage means and spaced from said other yoke, said half yoke including a vertically elongated slot terminating at the free end of said half yoke for receiving said second pusher dog, said half yoke terminating above or below the axis of said sprockets with said slot being open at its free end to receive and release said second pusher dog such that said second pusher dog is in confined driving engagement with said half yoke slot during movement of said second pusher dog along one of said upper or lower paths of said chain; and work handling means carried by said carriage means and having means for gripping and releasing the work piece, said means for gripping and releasing the work piece being cooperatively associated with the position of said carriage means whereby as said carriage means is moved toward said press along said second guide portion, said means for gripping and releasing the work piece moves on an incline into gripping engagement with the work piece, and as said carriage means is moved away from the press, said means for gripping and releasing the work piece grips the work piece to move it up and out of the press.

6. The apparatus according to claim 5 wherein said drive means includes a second half yoke aligned above or beneath said first half yoke and terminating respectively above or below the axle of said sprockets, said second yoke having a vertical slot terminating at the free end of said second yoke and opening inwardly toward said first half yoke for intermittent confined driving engagement by said second pusher dog during movement of said second pusher dog along the other of said upper and lower paths of said chain.

7. The apparatus according to claim 6 wherein said second pusher dog becomes disengaged from either of said first and second half yoke slots when said carriage is moved along said second guide portion, said carriage means and yoke being tiltable about said first pusher dog confined in said yoke slot as said carriage means is moved along said second guide portion.

8. A material handling device for inserting or removing work pieces in a press comprising, in combination:

a support;
stationary guide means mounted on said support and having a horizontal portion and a terminal portion extending downwardly from the outer end of the horizontal portion at an incline thereto;
carriage means movable along said guide means toward and away from the press;
reciprocating drive means for continuously and reciprocally moving said carriage means back and forth along said guide means; and
work handling means carried by said carriage means and having means for automatically gripping and releasing the work piece, said means for gripping and releasing the work piece being cooperatively associated with the position of said carriage means whereby as said carriage means is moved toward said press along said second terminal guide portion, said means for gripping and releasing the work piece moves both vertically and horizontally on an incline into gripping engagement with the work piece, and as said carriage means is moved away from the press, said means for gripping and releasing the work piece grips the work piece to move it up and out of the press for travel along said horizontal portion.

9. The device according to claim 8 wherein said gripping means is comprised of a pair of jaws actuated in time sequence with the position of said carriage along said tracks so that said jaws are actuated when said carriage reaches the outer position of said second portion of said tracks and is reversely actuated at a second position along the first portion of said tracks.

10. The device according to claim 8 wherein said drive means is comprised of a continuous chain having a pusher dog assembly connected thereto and moving continuously back and forth with said chain, said pusher dog assembly being cooperatively engageable with said carriage to propel said carriage continuously back and forth along said tracks.

11. The device according to claim 10 wherein said drive means includes a yoke extending to one side of said chain, said yoke having an elongated slot extending at least above and below the upper and lower paths of said chain for receipt of said pusher dog assembly, said drive means also including a pair of vertically aligned subyokes to the other side of said chain, said subyokes each having an elongated slot open at the inner opposed ends for intermittent receipt of said pusher dog assembly wherein said pusher dog assembly is confined within said yoke slot and one of said subyoke slots during movement along both the upper and lower paths.

* * * * *